(12) United States Patent
Wilson et al.

(10) Patent No.: US 10,713,049 B2
(45) Date of Patent: Jul. 14, 2020

(54) STUNT BOX TO BROADCAST AND STORE RESULTS UNTIL RETIREMENT FOR AN OUT-OF-ORDER PROCESSOR

(71) Applicant: Avago Technologies International Sales Pte. Limited, Singapore (SG)

(72) Inventors: Sophie Wilson, Lode Cambridge (GB); Tariq Kurd, Bishopston (GB)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 484 days.

(21) Appl. No.: 14/530,123

(22) Filed: Oct. 31, 2014

(65) Prior Publication Data

US 2015/0309799 A1  Oct. 29, 2015

Related U.S. Application Data

(60) Provisional application No. 61/984,711, filed on Apr. 25, 2014, provisional application No. 61/984,707, filed on Apr. 25, 2014, provisional application No. 61/984,710, filed on Apr. 25, 2014, provisional application No. 61/984,709, filed on Apr. 25, 2014, provisional application No. 61/984,708, filed on Apr. 25, 2014, provisional application No. 61/984,706, filed on Apr. 25, 2014.

(51) Int. Cl.
*G06F 9/38* (2018.01)
*G06F 9/30* (2018.01)

(52) U.S. Cl.
CPC ...... *G06F 9/30181* (2013.01); *G06F 9/30145* (2013.01); *G06F 9/3834* (2013.01); *G06F 9/3836* (2013.01)

(58) Field of Classification Search
CPC .............................. G06F 9/3855; G06F 9/3857
See application file for complete search history.

(56) References Cited

U.S. PATENT DOCUMENTS

| 5,625,788 | A | * | 4/1997 | Boggs | G06F 9/3836 712/214 |
| 5,765,016 | A | * | 6/1998 | Walker | G06F 9/3836 712/217 |
| 5,933,618 | A | * | 8/1999 | Tran | G06F 9/30152 712/212 |
| 6,134,645 | A | * | 10/2000 | Nguyen | G06F 9/3834 712/205 |
| 6,237,082 | B1 | * | 5/2001 | Witt | G06F 9/30036 711/E12.075 |

(Continued)

*Primary Examiner* — Jacob Petranek
(74) *Attorney, Agent, or Firm* — Xsensus LLP (57) ABSTRACT

A processor including a stunt box with an intermediate storage, including a plurality of registers, configured to store a plurality of execution pipe results as a plurality of intermediate results; a storage, communicatively coupled to the intermediate storage, configured to store a plurality of storage results which may include one or more of the plurality of intermediate results; and an arbiter, communicatively coupled to the intermediate storage and the storage, configured to receive the plurality of execution pipe results, the plurality of intermediate results, and the plurality of storage results and to select an output to retire from of the plurality of results, the plurality of intermediate results, and the plurality of storage results.

16 Claims, 5 Drawing Sheets

(56) References Cited

U.S. PATENT DOCUMENTS

| | | | | |
|---|---|---|---|---|
| 6,629,233 B1* | 9/2003 | Kahle | ............... | G06F 9/3013 |
| | | | | 712/217 |
| 7,080,170 B1* | 7/2006 | Zuraski, Jr. | ............ | G06F 5/10 |
| | | | | 710/52 |
| 7,096,345 B1* | 8/2006 | Chen | ............... | G06F 9/3838 |
| | | | | 712/217 |
| 2008/0022075 A1* | 1/2008 | Osanai | ............ | G06F 9/3824 |
| | | | | 712/218 |
| 2010/0131742 A1* | 5/2010 | Col | ............ | G06F 9/3842 |
| | | | | 712/220 |
| 2011/0060892 A1* | 3/2011 | Henry | ............ | G06F 7/483 |
| | | | | 712/222 |
| 2014/0372732 A1* | 12/2014 | Fleischman | ......... | G06F 9/3842 |
| | | | | 712/214 |

* cited by examiner

STUNT BOX TO BROADCAST AND STORE RESULTS UNTIL RETIREMENT FOR AN OUT-OF-ORDER PROCESSOR

CROSS REFERENCE TO RELATED APPLICATIONS

This application claims the benefit of U.S. Provisional Patent Appl. No. 61/984,706, filed Apr. 25, 2014, U.S. Provisional Patent Appl. No. 61/984,707, filed Apr. 25, 2014, U.S. Provisional Patent Appl. No. 61/984,708, filed Apr. 25, 2014, U.S. Provisional Patent Appl. No. 61/984,709, filed Apr. 25, 2014, U.S. Provisional Patent Appl. No. 61/984,710, filed Apr. 25, 2014, and U.S. Provisional Patent Appl. No. 61/984,711, filed Apr. 25, 2014. Each of the listed applications are incorporated herein by reference in their entireties.

FIELD OF THE DISCLOSURE

The present disclosure relates generally to computer processors.

BACKGROUND

Advances in semiconductor manufacturing have made it possible to incorporate large amounts of logic circuitry on an integrated circuit. In turn, this has led to advances in digital systems architecture. One particular area of digital systems architecture that has benefited greatly from the capability to include vast arrays of logic circuitry on a single integrated circuit is processor design.

BRIEF DESCRIPTION OF THE DRAWINGS

Embodiments are described with reference to the accompanying drawings. In the drawings, like reference numbers indicate identical or functionally similar elements. Additionally, the left most digit(s) of a reference number identifies the drawing in which the reference number first appears.

FIGS. 1, 2, and 3 illustrates various components, their arrangements, and interconnections, and is not drawn to scale.

DETAILED DESCRIPTION

The following Detailed Description refers to accompanying drawings to illustrate exemplary embodiments. References in the Detailed Description to "one exemplary embodiment," "an illustrative embodiment", "an exemplary embodiment," and so on, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure.

It is to be understood that the phraseology or terminology herein is for the purpose of description and not of limitation, such that the terminology or phraseology of the present specification is to be interpreted by those skilled in relevant art(s) in light of the teachings herein.

Terminology

The terms, chip, die, integrated circuit, semiconductor device, and microelectronic device, are often used interchangeably in the field of electronics. The present disclosure is applicable to all the above as these terms are generally understood in the field.

FET, as used herein, refers to metal-oxide-semiconductor field effect transistors (MOSFETs). An n-channel FET is referred to herein as an NFET. A p-channel FET is referred to herein as a PFET.

CMOS refers to a semiconductor manufacturing process in which both NFETs are PFETs are formed in an integrated circuit.

CMOS circuit refers to a circuit in which both NFETs and PFETs are used together.

VLIW is an acronym for Very Long Instruction Word.

VLIW instruction, as used in the description of exemplary embodiments herein, refers to a set of instructions grouped together for presentation to the instruction decoder. The individual instructions in the set of instructions are assigned to one of a plurality of execution pipes for execution.

IC0 refers to a pseudo-stage which is on the input to the instruction cache.

IC1 refers to the instruction cache stage. Fetch requests to the instruction cache are made in this cycle, along with calculations to determine which PC to fetch next. VLIW instructions previously requested are supplied in this stage.

DE1 refers to the first stage of the instruction decoder.

DE1_operation refers to a logical operation performed by the first stage of the instruction decoder.

DE1_time refers to a cycle in which a DE_1 operation occurs.

DE2 refers to the second stage of the instruction decoder.

DE2_operation refers to a logical operation performed by the second stage of the instruction decoder.

DE2_time refers to the cycle in which the reading and renaming of the general register file (GRF) and predicate register file (PREG) occurs.

RS refers to a reservation station. There are several different reservation stations that can be enqueued to. In the best case this is a single cycle stage, however operations may end up queuing here for many cycles.

EXn refers to an nth stage of an execution pipe. Examples of execution pipes include ALU short and long pipes, BRANCH and the Load Store Unit.

SHP refers to a short execution pipe. A short execution pipe is used to perform single cycle operations.

LOP refers to a long execution pipe. A long execution pipe is used to execute instructions that take 2-8 cycles to complete.

LSU refers to the load stole unit.

DTCM refers to a data tightly coupled memory.

PBUS refers to a bus that connects to a peripheral memory.

DCACHE refers to the data cache used to cache accesses to peripheral memory.

Enqueue refers to the action in which a VLIW instruction in DE2 is split into its component operations and then move forward down the pipe into the reservation stations.

Issue refers to moving an operation from the reservation station to an execution unit. An operation is referred to as being issued when it is moved from the reservation station to an execution unit. An operation is a component part of a VLIW instruction.

Current PC refers to the value of the program counter (PC) for the instruction currently in a given stage. Each stage of the pipe will have its own version of the current PC.

Next PC refers to the next PC to fetch from the Icache. For straight line code this will be current PC+current instruction width, for redirected code it will be the new target PC.

Loop start address refers to the address of the first instruction in a loop body, i.e., the address to branch to for starting a new loop iteration.

Loop end address refers to the address of the first instruction after a loop body, i.e., the address to branch to for naturally exiting the loop.

Loop body refers to the instructions beginning with the loop start address and ending with the loop match address.

Loop match address refers to the address of the last instruction in a loop body.

Loop count refers to the number of iterations of the loop that should be executed. This comes from either an immediate field for LOOP operations, or a general register for ZLOOP and ZLOOPS operations.

SIN refers to the Speculation Index Number, which is used to identify instructions enqueued speculatively in the shadow of a branch.

SIN resolution refers to determining whether a branch was correctly speculated or not. SIN resolution is performed in EX1.

SIN validation refers to a branch in EX1 that was correctly speculated, which in turn will validate the SIN associated with the operations in the shadow of the correctly speculated branch. A validated operation is one which will update the architectural state.

SIN cancellation refers to a branch in EX1 that was incorrectly speculated, which in turn will cancel all outstanding SINs, and perform an EX1 redirect, effectively removing all operations that were in the shadow of the branch it from the execution pipe. In one embodiment, removing the operation that were in the shadow of the incorrectly speculated branch includes changing the state of a bit associated with each of those instruction in the execution pipe.

State coherency enforcement (SCE) refers to actions performed by an internal mechanism to prevent future operations from seeing an incoherent machine state.

Trap events refers to the set of synchronous, asynchronous and fault events.

Synchronous trap events relate to a specific instruction and are detected in time to prevent the instruction causing the event from being enqueued. The Supervisor Call (SVC) instruction fits into this category. These are precise as they occur in an architecturally defined place in the instruction stream.

Asynchronous trap events (interrupts) occur independently from the current instruction sequence. Asynchronous exceptions fit into this.

Fault trap events prevent program flow from recovering. Examples of fault trap events are a misaligned PC and a data abort. Faulting operations with a register destination must complete a register value.

A processor architecture is disclosed that includes a register file having a plurality of registers, and is configured for out-of-order instruction execution, further includes a renamer unit that produces generation numbers that are associated with register file addresses to provide a renamed version of a register that is temporally offset from an existing version of that register rather than assigning a non-programmer-visible physical register as the renamed register. The processor architecture includes a small reset DHL Gshare branch prediction unit coupled to an instruction cache and configured to provide speculative addresses to the instruction cache. The processor architecture is suitable for implementation in an integrated circuit. Such an integrated circuit is typically implemented with CMOS circuitry.

In typical embodiments a processor in accordance with this disclosure is implemented in an integrated circuits as an embedded processor.

Figure 1:
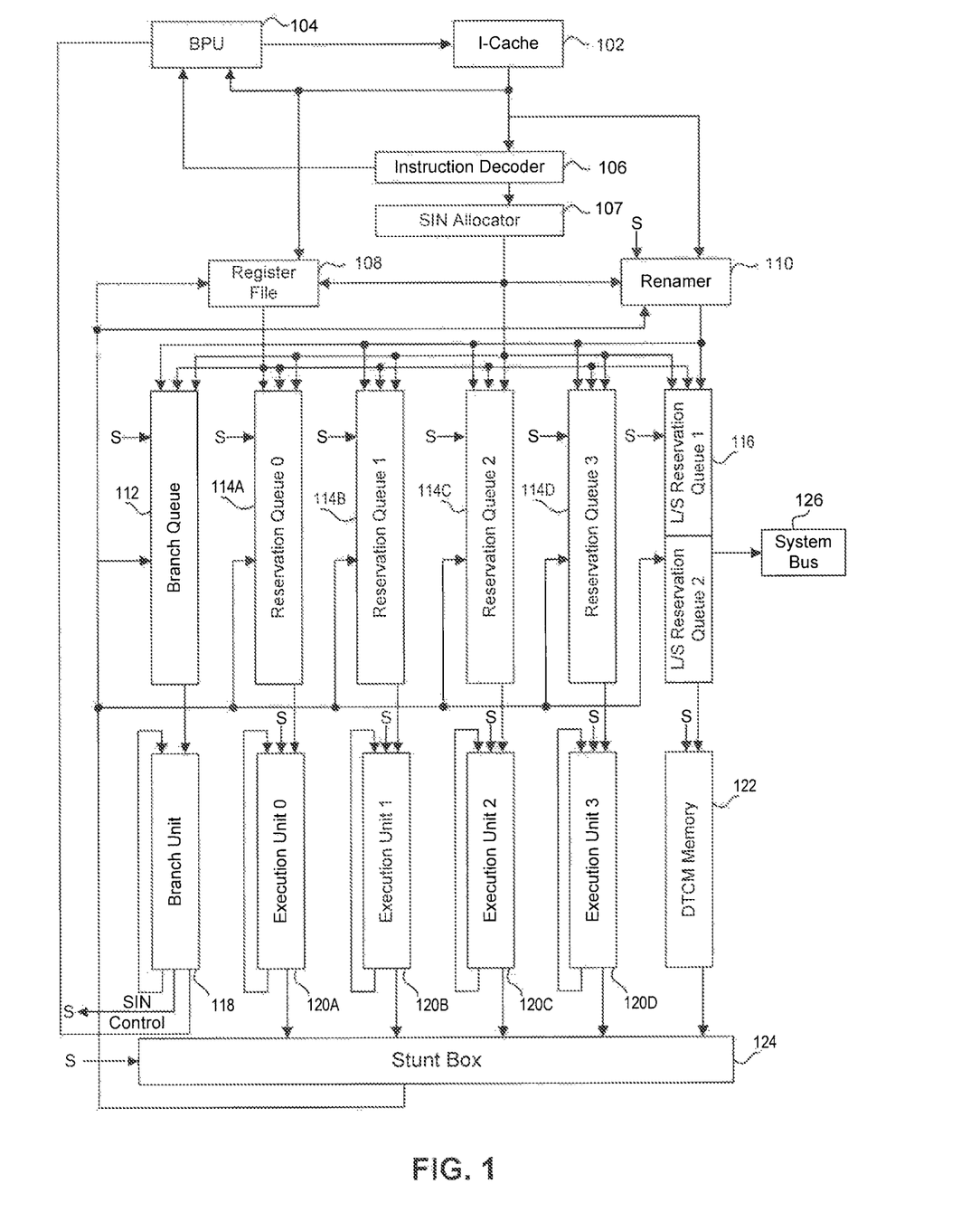
FIG. 1 is a high-level block diagram of an exemplary processor.

FIG. 1 is a high-level block diagram illustrating the major blocks of an exemplary processor in accordance with the disclosure. The exemplary processor includes an instruction cache 102 coupled to receive a VLIW instruction address from a branch prediction unit 104, and further coupled to provide an output to branch prediction unit 104, an instruction decoder 106, a register file 108, and a generation renamer 110. Generation renamer 110 is coupled to branch execution unit 118 to receive a SIN control signal, coupled to the SIN Allocator to receive a SIN number, coupled to a stunt box 124 to receive an output from an operand copy network, and coupled to the branch reservation queue 112, execution pipe reservation queues 114A, 114B, 114C, 114D, and load/store reservation queue 116. Register file 108 is coupled to stunt box 124 to receive input from the operand copy network, and is further coupled to the branch reservation queue 112, execution pipe reservation queues 114A, 114B, 114C, 114D, and load/store reservation queue 116. Branch reservation queue 112 is coupled to branch execution unit 118. Execution pipe reservation queues 114A, 114B, 114C, 114D are each respectively coupled to corresponding execution pipes 120A, 120B, 120C, and 120D. Execution pipes 120A, 120B, 120C, and 120D are each coupled to provide output to stunt box 124. Each of execution pipes 120A, 120B, 120C, and 120D are respectively coupled to provide their output back to their inputs, and each is further coupled to the output of branch execution unit 118 to receive the SIN control signal. A memory 122 is coupled to the load/store unit 116. And load/store unit 116 is further coupled to a system bus 126.

Instruction cache 102 holds VLIW instructions that have been previously fetched by an instruction fetch unit (not shown). The VLIW instructions are typically fetched from a memory disposed external to the processor itself. Branch prediction unit 104 is shown coupled to instruction cache 102. Branch prediction unit 104 provides the address of the VLIW instruction to fetch. If the requested VLIW instruction is present in instruction cache 102 then it is provided to an instruction decoder 106. If the requested VLIW instruction is not present in instruction cache 102 then a cache miss has occurred and the requested instruction is fetched from a memory that is disposed outside of the processor.

Branch prediction unit 104 has several functions, including providing the program counter value needed by instruction cache 102, and the program counter value needed by different stages and logic blocks throughout the processor.

For sequentially executing program code, the program counter value simply changes by the length of the instruction just fetched. But when a branch instruction is detected, then branch prediction unit 104 determines what from what address the next instruction should be fetched. In this exemplary processor, branch prediction unit 104 uses a small reset DHL Gshare branch prediction mechanism to determine the next instruction address.

Instruction decoder 106 decodes the content of the VLIW instructions and provides control information to various other blocks of the processor.

Register file 108 contains a predetermined number of programmer-visible registers. These registers hold values that are used during the execution of a program.

Individual instructions obtained from the VLIW instruction are enqueued into a selected reservation queue. When the operands needed for execution of an enqueued instruction become available, that instruction is issued to the execution pipe associated with the selected reservation queue.

Generation renamer 110 is used to assign generation numbers to register instances in instructions when those register instances would conventionally be reassigned to a different non-programmer-visible physical register.

The reservation queues hold instructions that are waiting to be issued.

Stunt box 124 provides a mechanism for leeching and distributing the outputs of the execution pipes. Stunt box 124 provides data to an operand copy network. The operand copy network allows all the results of the execution pipes to be made available to other blocks within the processor. In this way, an instruction waiting for an operand to be produced from the execution of another instruction does not have to wait for that operand to be written back to the register file and then read out of the register file. Rather the required operand is made available, via the operand copy network, to all the locations throughout the processor that are waiting for that particular result.

System bus 126 provides a mechanism for the embedded processor to communicate with other logic blocks on the integrated circuit that are external to the processor itself.

Stunt Box Overview

In a scalar processor design, each instruction is fetched, decoded, executed, and retired in order. When retired the results of executed instructions update the register file to be used by future instructions. An instruction can be fetched in parallel with another instruction is decoded, another instruction being executed, and another instruction being retired. Each of these portions of the processor can be called a stage. The speed of the processor can then be estimated by the longest time it takes an instruction to complete a stage. Thus, if the execution stage is the longest stage, and it takes 1 second to complete that stage, then the execution time of a program can be estimated by the number of instructions required to run it, i.e., if the program is 60 instructions long, then the estimated time to complete the program would be 1 minute. Thus, in order to increase the speed at which the processor can run, one or more of these stages can be broken up into smaller sections. But this estimate may be incorrect because certain instructions may need to wait for other instruction to complete before they can be executed. Thus, results from an instruction in one stage, for example at the end of the execution stage, can be forwarded to other stages.

Superscalar processors take these concepts one step further. Rather than just fetching, decoding, executing, and retiring one instruction, they implement multiple parallel pipelines allowing them to handle multiple instructions at the same time. Thus, a superscalar processor can be designed to fetch, decode, execute, and retire 2, 4, 8, or more instructions at the same time. But the number of pipelines a superscalar processor can implement is limited by the design requirement of the processor. For example, the register file, which will store the results of most of the instructions within a program, may only be able to be designed to handle a limited number of writes given space and wiring limitations.

A stunt box provides a way to increase the number of parallel pipelines without requiring an equivalent increase in the register files ability to accept new data. As illustrated in FIG. 1, the stunt box received results from all of the execution pipelines. The stunt box can also provide one or more of the results to the remainder of the machine. Results that are received from the execution pipeline and not provided to the rest of the machine are retained, to be provided to the machine at a later time. While similar in position to a reorder buffer (ROB) in an out-of-order processor, i.e., between the creation of the results and the writing back of the results to the architectural state, the stunt box and the ROB perform two different tasks. The stunt box is primarily a way to smooth bandwidth utilization for a superscalar machine with the ability to create more results than it can retire in a single clock cycle. The ROB allows an out of order machine to create results out of order, but to write them back to the architectural state in order. While a ROB could be designed with the ability to accept more results than can be retired, it would still be required to retire the results in order. This can be advantageous, for example when handling precise exceptions. The stunt box disclosed in this application, instead, allows for one or more results to be broadcast and retired when available, in order to smooth broadcast and retirement bandwidth throughout the execution of a program.

The stunt box provides many benefits. First, it allows a processor to have more parallel pipelines than the number of results that can be retired in a ingle lock cycle. Second, it allows the processor to proceed at full bandwidth for a longer period of time before having to stall because it is not able to retire results as fast as it is able to create them. For example, if the stunt box can hold 20 addition results, then the processor can continue to run through a program, where certain parts of the program are execution intensive, and reduce the amount of time the program would stall due to retirement congestion. When more results are being created than can be retired, the additional results can be stored in the stunt box without slowing down the machine. When fewer results are being created than can be retired, the processor can empty out the stunt box without slowing down the machine. This can be seen by the example below:

Code to be executed:
4 add instructions
4 store instructions
4 add instructions
4 store instructions

| | Processor without a stunt box that can fetch 4 instructions and retire 2 results each cycle | | Processor with a stunt box that can fetch 4 instructions and retire 2 results each cycle | | |
|---|---|---|---|---|---|
| Cycle | Inst Retired | Results retired | Inst Retired | Results retired | Results in the storage |
| 1 | 2 add | 2 | 4 add | 2 | 2 |
| 2 | 2 add | 2 | 4 store | 2 | 0 |
| 3 | 4 store | 0 | 4 add | 2 | 2 |

-continued

| | Processor without a stunt box that can fetch 4 instructions and retire 2 results each cycle | | Processor with a stunt box that can fetch 4 instructions and retire 2 results each cycle | | |
|---|---|---|---|---|---|
| Cycle | Inst Retired | Results retired | Inst Retired | Results retired | Results in the storage |
| 4 | 2 add | 2 | 4 store | 2 | 0 |
| 5 | 2 add | 2 | | | |
| 6 | 4 store | 0 | | | |

In the above example, where both processors can fetch 4 instructions and retire 2 instructions each cycle, the processor with the stunt box can finish the code fragment quicker. For simplicity sake, we will assume that all of the instructions above are independent and do not cause any other stalls within the processor. The processor without the stunt box can only execute 2 add instructions at a time because it can only retire 2 results each cycle. The processor with the stunt box can execute all 4 add instructions each time. It retires 2 of the results immediately, and retires the two remaining results while the store instructions are being executed. Below is a longer example that more clearly shows the advantages of using a stunt box. Even though 4 add instructions can be fetched, since only 2 results can be retired during any clock cycle, only 2 of the add instructions can retire.

Code to be executed:
4 add instructions
4 add instructions
4 add instructions
4 add instructions
4 add instructions
4 add instructions
4 store instructions
4 store instructions
4 store instructions
4 store instructions
4 store instructions
4 store instructions

| | Processor without a stunt box that can fetch 4 instructions and retire 2 results each cycle | | Processor with a stunt box that can fetch 4 instructions and retire 2 results each cycle | | |
|---|---|---|---|---|---|
| Cycle | Inst Retired | Results retired | Inst Retired | Results retired | Results in the storage |
| 1 | 2 add | 2 | 4 add | 2 | 2 |
| 2 | 2 add | 2 | 4 add | 2 | 4 |
| 3 | 2 add | 2 | 4 add | 2 | 6 |
| 4 | 2 add | 2 | 4 add | 2 | 8 |
| 5 | 2 add | 2 | 4 add | 2 | 10 |
| 6 | 2 add | 2 | 4 add | 2 | 12 |
| 7 | 2 add | 2 | 4 store | 2 | 10 |
| 8 | 2 add | 2 | 4 store | 2 | 8 |
| 9 | 2 add | 2 | 4 store | 2 | 6 |
| 10 | 2 add | 2 | 4 store | 2 | 4 |
| 11 | 2 add | 2 | 4 store | 2 | 2 |
| 12 | 2 add | 2 | 4 store | 2 | 0 |
| 13 | 4 store | 0 | | | |
| 14 | 4 store | 0 | | | |
| 15 | 4 store | 0 | | | |
| 16 | 4 store | 0 | | | |
| 17 | 4 store | 0 | | | |
| 18 | 4 store | 0 | | | |

Stunt Box Structure

Figure 2:
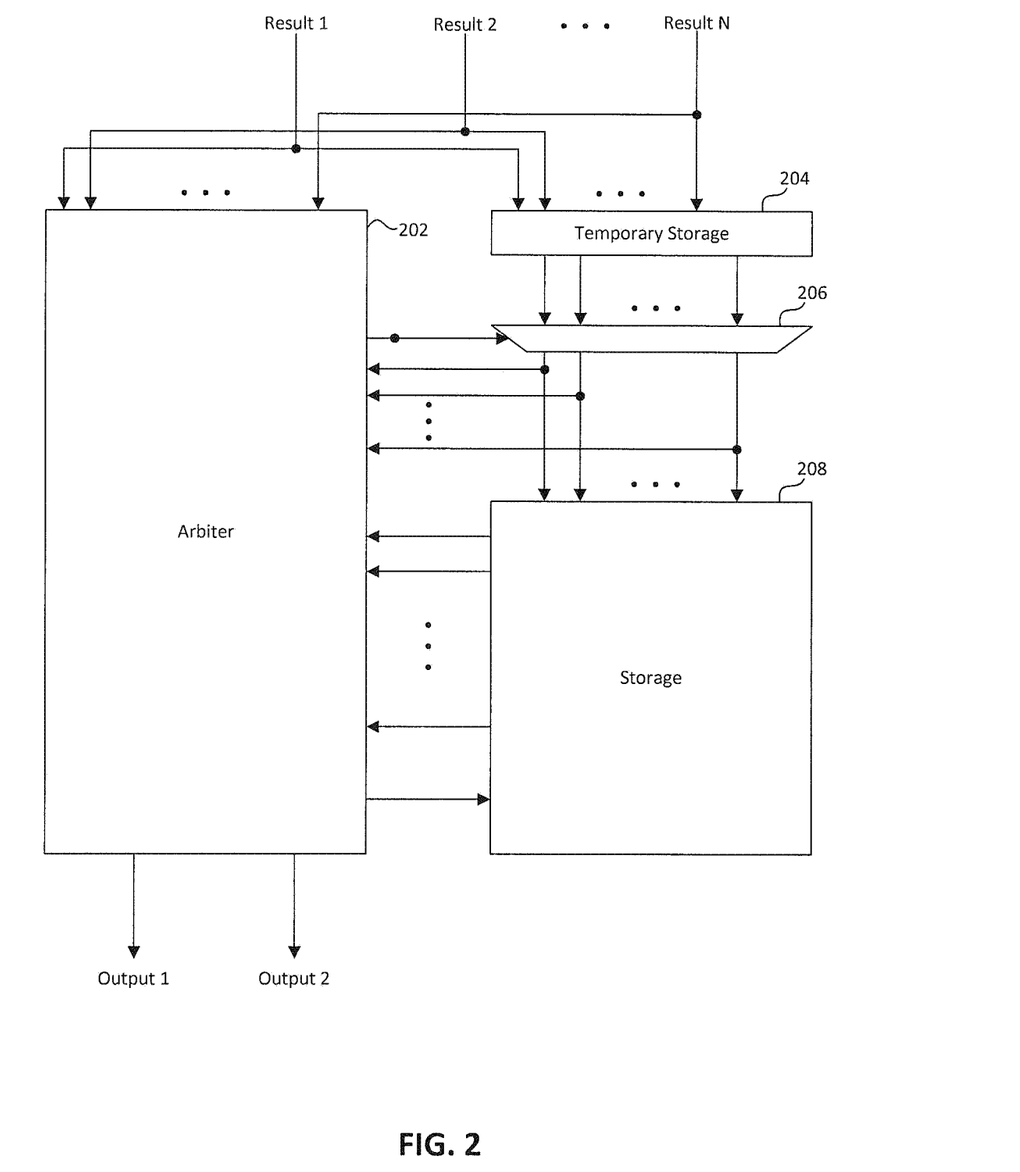
FIG. 2 is a high-level block diagram of an exemplary processor with a stunt box implemented.
Figure 3:
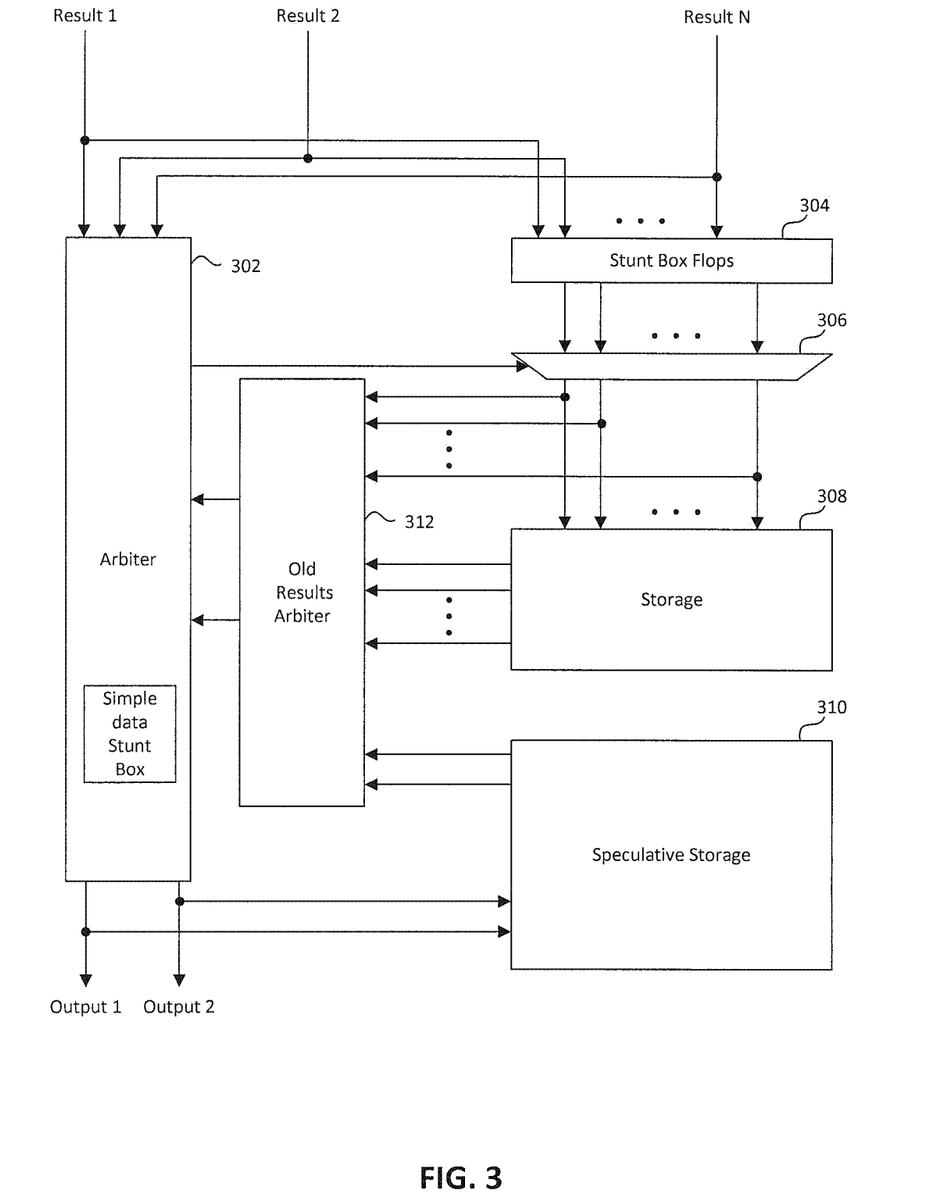
FIG. 3 is a high-level block diagram of another exemplary processor with a stunt box implemented.
Figure 4:
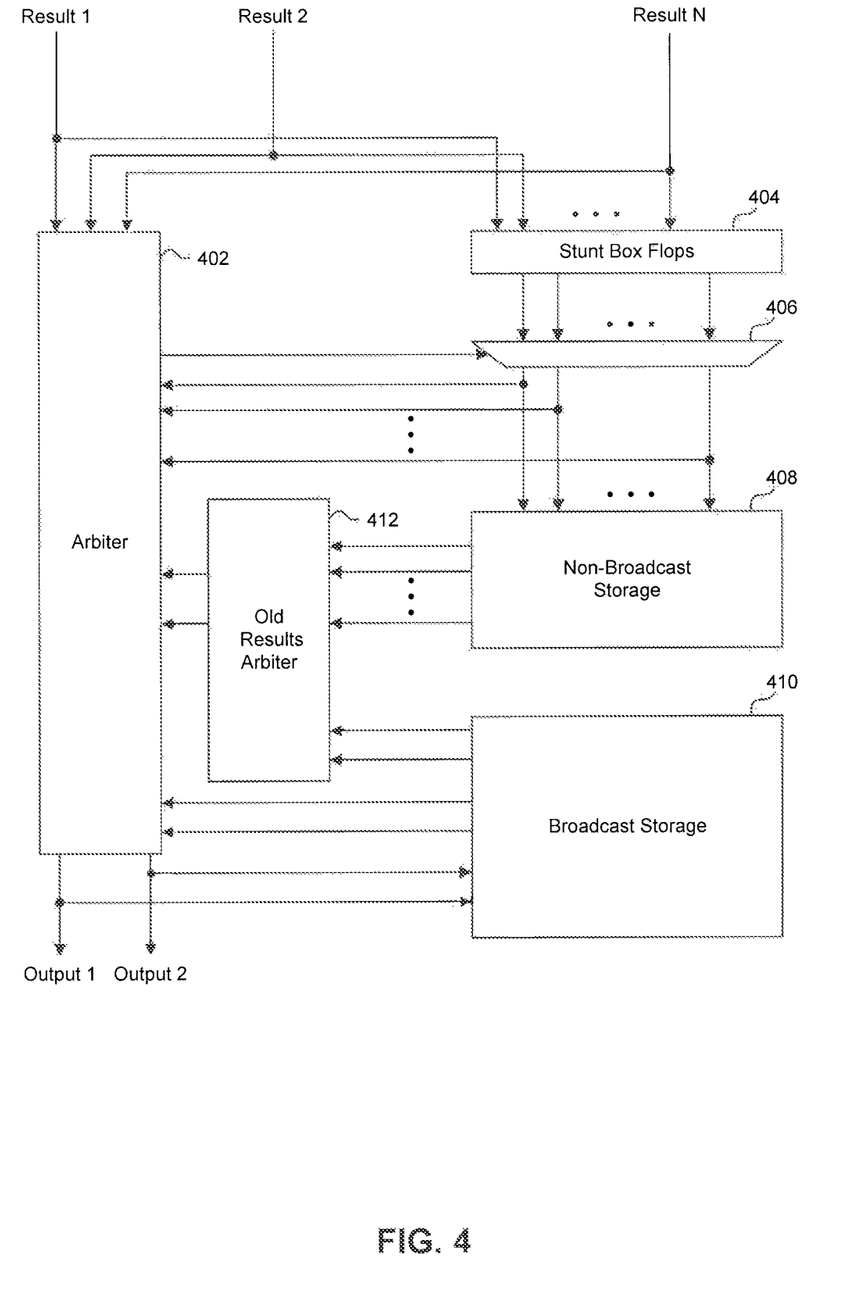
FIG. 4 is a high-level block diagram of another exemplary processor with a stunt box implemented.

FIGS. 2, 3, and 4 illustrate exemplary embodiments of a stunt box

Referring to FIGS. 2, an exemplary embodiment of a stunt box can include an arbiter 202, temporary storage 204, a stunt box mux 206, and storage 208.

In an embodiment, results from execution units, for example results 1-N in FIG. 2 are sent to both arbiter 202 and temporary storage 204.

In an embodiment, temporary storage 204 stores the prior results from one cycle of the processor as new results from the next cycle are received. The prior results from temporary storage 204 are provided to stunt box mux 206.

In an embodiment, stunt box mux 206 receives prior results from temporary storage 204 and sends non-retired results to storage 208. As the arbiter determines which results will be retired, as discussed below, the arbiter selects which results from temporary storage 204 should be moved to storage 208. The arbiter can then update the select line of stunt box mux 206 in order to make sure the correct results are sent to storage 208.

In an embodiment, storage 208 receives the selected results from stunt box mux 206, and provides a set of results to arbiter 202. Storage 208 is configured to store results that have not yet been retired.

As discussed above, these results may need to be stored because more results are being generated than can be retired over a given time. In addition, these results may be speculative, and cannot be retired until the processor has confirmed that the associated instruction was supposed to have been fetched. For example, when a conditional branch instruction is encountered, the processor may speculate that the branch is taken, and fetch instructions from the location pointed to by the branch instruction. But the processor cannot retire these instructions until the conditions upon which the branch is conditioned have been determined. Once these have been confirmed, the results of instructions along the speculative path can be retired. But if the speculation was incorrect, these results must be removed without being retired.

In an embodiment, results from the execution units, stunt box mux 206, and storage 208 are received by arbiter 202. Arbiter 202 can be configured to select which results should be retired. For example, the arbiter may choose to retire results in storage 208 before results from stunt box mux 206, and results from stunt box mux 706 before the results from the execution units. This may be because the arbiter prefers to retire older results over newer results. In addition, the arbiter may make decisions on which results to retire based on available retirement resources and result interactions. For example, the stunt box may be configured to retire two results every cycle. In addition, the stunt box may be configured so that one of these results can be a large result (for example 128 bits) and one may be a smaller result (for example 64 bits). In an embodiment, based on the design of the register file, the 128 bits can comprise two consecutive registers. For example, the register file can be configured such that registers R0 and R1 (each of which is 64 bits) can be written to in the same cycle using the single large output. This may be true for all even/odd pairs of consecutive registers, e.g., R0/R1, R2/R3, R4/R5, etc. Thus the arbiter may choose to combine an R0 and R1 results in the large output, even if the R0 was stored in storage 208 and R1 was received from the execution units. Arbiter 202 may inform storage 208 to delete an output if the output is not speculative.

A person skilled in the art would understand that many other variations are possible, depending on the design of the processor, without deviating from this disclosure.

Referring to FIG. 3, an exemplary embodiment of a stunt box can include an arbiter 302, temporary storage 304, a stunt box mux 306, storage 308, speculative storage 310, and old results arbiter 312. Arbiter 302, temporary storage 304, a stunt box mux 306, and storage 308 can perform similarly to arbiter 202, temporary storage 204, a stunt box mux 206, and storage 208, except as indicated below.

In an embodiment, additional speculative storage 310 can be included in the stunt box. One of the issues in storage 308 is the connectivity of all of the results stored in storage 308. Storage 308 can be configured so that any possible combination of stored results can be provided to arbiter 302. As the number of results stored in storage 308 increases, the complexity of selecting results to provide to arbiter 302 increases exponentially.

Speculative storage 310 addresses this concern. Speculative results can be retired twice. First, the speculative results are retired with an indication that it is still speculative. This allows other speculative instructions to also continue executing using these results. This retirement can be referred to as speculative retirement. Eventually, if the speculative instruction is confirmed, the speculative result is retired again; updating any additional instructions that rely on this result and updating the register file with the, now, non-speculative result. The second retirement of speculative results can be handled a little differently than the first retirement. These results can now be retired in the same order in which they were originally retired. Thus, a first-in-first-out (FIFO) queue can be used rather than increasing the size of the complicated storage 308 to also store speculative instructions that have been speculatively retired.

In an embodiment, storage 308 can be configured to store all results that have not been retired yet, speculative storage 310 can be configured to store all speculatively retired instructions, and arbiter 302 can be configured to select results to be retired from the results received from the execution units, stunt box mux 306, storage 308, and speculative storage 310. Speculative storage 310 stores speculative results. In an example, arbiter 302 may always inform speculative storage 310 to delete speculative results. In an example, there is a second stunt box including another arbiter that receives small results and retires the small results. The second stunt box may include a second speculative storage to store a speculative result from the small results if the speculative result is marked as speculative. The second stunt box may retire a confirmed result from the second speculative storage when the speculative result is confirmed.

In an embodiment, an old results arbiter 312 can be configured to select one or more results to provide to arbiter 302 from stunt box mux 306 and storage 308. For example, if arbiter 302 can only retire 2 results, old results arbiter 312 can be configured to provide only two results to arbiter 302. As discussed above with regard to arbiter 302, these results may be selected based on age or on the design of the processor. This allows simple logic within arbiter 302 to select the instruction to be retired. Arbiter 802 need only select between the results received from the execution units and the results received from old arbiter 312.

In an embodiment, old results arbiter 312 can also receive results from speculative storage 310.

In an embodiment, arbiter 302 can be configured to quickly retire certain data in order to reduce congestion. In an embodiment, arbiter 302 can comprise a simple data stunt box. The simple data stunt box may be configured to receive certain types of data, for example predicate data, from the execution units and retire this data separate from other results being retired by arbiter 302. In an embodiment, the data handled by the simple data stunt box may be small, for example 8 bits wide. Using the main output of the stunt box, for example the 64 bit and 128 bit outputs described above, for small data can lead to inefficient used of the retirement bandwidth. While this may be mitigated by attempting to combine the small data with larger data, this requires additional logic. By removing this data to the simple data stunt box, the congestion and latency of the main output can be reduced by also reducing the latency of the small data.

Referring to FIG. 4, another exemplary embodiment of a stunt box can include an arbiter 402, stunt box flops 404, a stunt box mux 406, a non-broadcast storage 408, a broadcast storage 410, and an old results arbiter 412. Arbiter 402 stunt box flops 404, stunt box mux 406, non-broadcast storage 408, broadcast storage 410, and old results arbiter 412 can perform similarly to arbiter 302, temporary storage 304, stunt box mux 306, storage 308, speculative storage 310, and old results arbiter 312, except as indicated below.

In an embodiment, additional non-broadcast storage 408 and broadcast storage 410 can be included in a stunt box in place of, or in addition to, storage 308 and speculative storage 310. Non-broadcast storage 408 can be configured to maintain results from the execution and memory units that have not yet been broadcast through the system. For example, if four results were received from the execution unit in a single cycle, the system may broadcast none or one or two of those results. The stunt box could be configured to store the results that were not broadcast in non-broadcast storage 408. As bandwidth becomes available these results may be broadcast over time. A person skilled in the art would understand that the results stored in non-broadcast storage 408 could be speculative or non-speculative. In an embodiment, non-broadcast storage 408 can be configured to provide the oldest stored results to old results arbiter 412.

Broadcast storage 410 can be configured to maintain results that have been broadcast by arbiter 402, but have not yet retired. For example, broadcast storage 410 can store speculative results that have been broadcast. A person of skill in the art would understand that this may be useful to update instructions that are in flight and depend on the speculative value. Broadcast storage can also store non-speculative results that need to be broadcast again before being retired.

In an embodiment, old results arbiter 412 can be configured to select between results provided by both non-broadcast storage 408 and broadcast storage 410. In an embodiment, broadcast storage 410 can provide results that are ready to be broadcast to old results arbiter 412. For example, broadcast storage 410 could provide results that were speculative previously, but have been confirmed. In an embodiment, old arbiter 412 can be configured to prefer results from broadcast storage 410 that are ready to retire over results from non-broadcast storage 408. For example, this configuration may be preferable because the results from broadcast storage 410 may be older than the results provided by non-broadcast storage 408.

In an embodiment, arbiter 402 can be configured to receive results from multiple entities within the stunt box. For example, it may receive results provided to the stunt box from the execution units, results stored in the stunt box flops 404, results from the old results arbiter 412, and speculative results from broadcast storage 410. As discussed above, arbiter 402 can be configured to select to broadcast results based on the results received from the different entities in the stunt box. For example, it may be configured to select results from the old results arbiter 412 before selecting results from the stunt box flops 404, and select the results from the stunt box flops 404 before selecting results received from the execution units, and select results received from the execution units before selecting to re-broadcast speculative results received from the broadcast storage 410. In an embodiment, based on the available output bandwidth, arbiter 402 can be configured to choose one or more of the results provided to broadcast.

Stunt Box Process

In an exemplary embodiment, the stunt box can be configured to determine the results to be broadcast.

Figure 5:
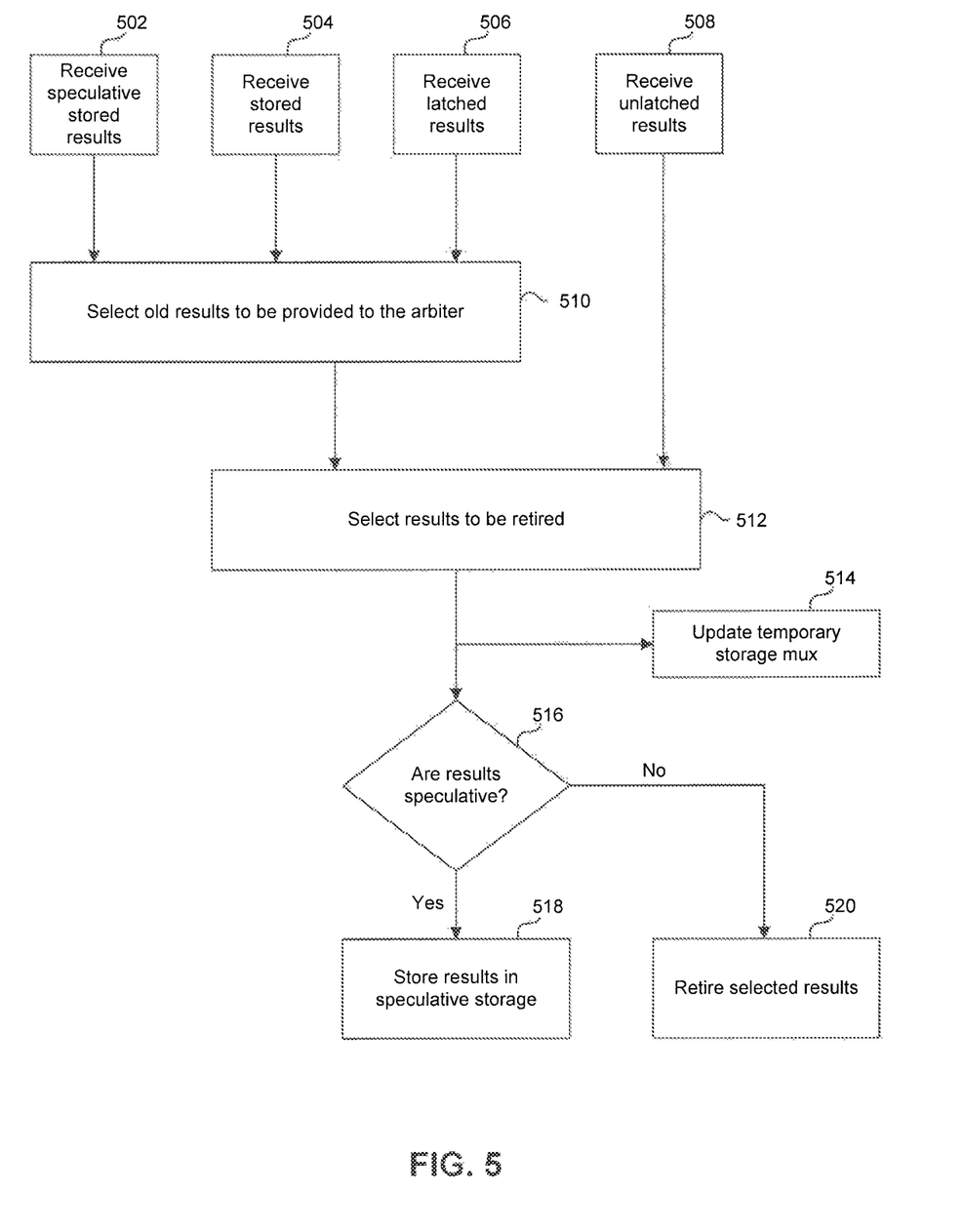
FIG. 5 is flowchart illustrating a result selection process, according to an example embodiment.

The process illustrated in FIG. 5 describes an exemplary method that the stunt box, for example the stunt box described with respect to FIG. 3, can select results to be broadcast. A person skilled in the art would understand that a similar method would be used by the exemplary stunt box implementations illustrated in FIGS. 2 and 4.

At step 502, an old results arbiter, for example old results arbiter 312 in FIG. 3, can receive speculative results that were previously stored, for example in speculative storage 310 in FIG. 3.

At step 504, the old results arbiter can receive previously stored results, for example in results stored in storage 308 in FIG. 3.

At step 506, the old results arbiter can receive previously latched results, for example in results latched in stunt box flops 304 in FIG. 3.

At step 510, the old results arbiter can select which results to provide to an arbiter, for example arbiter 302 in FIG. 3. In an embodiment, the old results arbiter may be configured to provide the arbiter with a number of results based on the arbiter's ability to broadcast those results. For example, if the arbiter is configured to broadcast either a large result and a small result or two small results, the old results arbiter may be configured to provide either a large result and a small result or two small results to the arbiter. In an embodiment, the old results arbiter may be configured to select between the results based on a predetermined priority. For example, the old results arbiter may initially select to provide any results it received from the speculative storage if those results are no longer speculative. Otherwise, it may be configured to choose results received from the storage because they are older than the results in the stunt box flops. Otherwise it may choose results received from the stunt box flops. And finally, if it still has bandwidth, it may provide the arbiter with speculative results received from the speculative storage.

At step 508, the arbiter can receive results provided to the stunt box, for example results from the execution units prior to being stored in the stunt box flops.

At step 512, the arbiter can select which results to broadcast. In an embodiment, the arbiter may be configured to broadcast one or more results received from the old results arbiter and the execution units. A person skilled in the art would understand that the results selected could be speculative, but need not be. In an embodiment, the arbiter can be configured to select results based on different criterion. For example, the arbiter may be configured to select non-speculative results over speculative results or may be configured to select older results over newer results. In addition, the selection may be based on the available bandwidth. A person skilled in the art would understand that multiple other criteria could be used and that multiple criteria could be used at the same time.

At step 514, once the arbiter determines which results will be broadcast, the stunt box mux, for example stunt box mux 306 in FIG. 3, can be updated to allow all non-broadcast results to be stored in storage, for example storage 308 in FIG. 3. If any of the results from the stunt box mux have been broadcast, they will either be retired, if they are not speculative, or stored in speculative storage, for example speculative storage 310 in FIG. 3.

At step 516, the system determines if the results to be broadcast are speculative.

If the results are speculative, then, at step 518, they can be stored in speculative storage.

If the results that were broadcast are not speculative, then, at step 520, they can be broadcast to all pending instructions in the system, and retired.

A person skilled in the art would understand that a similar method could be implemented on the system illustrated in FIG. 2. As illustrated in FIG. 2, rather than sending certain results to an old results arbiter, having an arbiter select between a reduced set of results, and then storing speculative results in a separate storage, the process implemented on FIG. 2 could be simplified. Any non-speculative results can be provided to arbiter 202. Arbiter 202 can be configured to select between the results, as disclosed above. The selected results can then be broadcast and retired.

A person skilled in the art would also understand that the process discussed above with respect to FIG. 5 could be modified to be implemented on the system illustrated in FIG. 4. But rather than providing the latched results to the old results arbiter, the latched results can be provided directly to the arbiter 402.

A person skilled in the art would understand that the system design and implementation can involve trade offs between the complexity and size of logic and memory between the arbiter, old results arbiter, main storage, and secondary storage. Each of the embodiments illustrated in FIGS. 2-4 tradeoff complexity and size between the different components, based on design constraints. A person skilled in the art would understand that these are merely illustrative examples of the concepts discussed throughout this application, and are not meant to limit the scope of this disclosure to any single disclosed embodiment.

CONCLUSION

It is to be appreciated that the Detailed Description section, and not the Abstract of the Disclosure, is intended to be used to interpret the claims. The Abstract of the Disclosure may set forth one or more, but not all, exemplary embodiments, and thus, is not intended to limit the disclosure and the subjoined Claims in any way.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the subjoined Claims and their equivalents.

What is claimed is:

1. A stunt box for selectively retiring a result from among a plurality of first results, the stunt box comprising:
   a first storage configured to store a plurality of execution pipe results as the plurality of first results;

a stunt box mux configured to selectively provide a plurality of second results from among the plurality of first results, the plurality of second results not including the result from among the plurality of first results;

a second storage configured to store the plurality of second results; and an arbiter configured to:

receive the plurality of execution pipe results, the plurality of first results, and the plurality of second results, select the result from the plurality of first results to retire, and provide a select line to the stunt box mux to configure the stunt box mux to not provide the result within the plurality of second results, wherein the arbiter is further configured to broadcast the plurality of execution pipe results, the plurality of first results, and the plurality of second results prior to retiring the result.

2. The stunt box of claim 1, wherein the arbiter is further configured to select the result based on a current set of available retirement resources.

3. The stunt box of claim 1, wherein arbiter is further configured to retire the result with an indication that the result is speculative, and further comprising:

a third storage configured to store the result as a speculative result in response to the indication.

4. The stunt box of claim 3, wherein the arbiter is further configured to inform the third storage to delete the speculative result in response to confirming a speculative instruction associated with the speculative result.

5. The stunt box of claim 3, wherein the third storage is comprises:

a first-in-first-out queue configured to provide the speculative result to the arbiter for retirement in response to confirming the speculative instruction.

6. The stunt box of claim 1, wherein arbiter is further configured to retire the result with an indication that the result is speculative, and further comprising:

a third storage configured to store the result as a speculative result in response to the indication;

a second arbiter configured to provide the speculative result to the arbiter for retirement in response to confirming a speculative instruction associated with the speculative result.

7. A method for selectively retiring a first result from among a plurality of first results, the method comprising:

receiving, by an arbiter, a second result from among a plurality of second results from a first storage, the plurality of second results not including the first result from among the plurality of first results;

receiving, by the arbiter, a third result from among the plurality of first results from a second storage;

receiving, by the arbiter, a fourth result from among a plurality of execution pipe results from an execution pipeline;

selecting, by the arbiter, the first result from among the second result, the third result, and the fourth result to retire;

providing, by the arbiter, a select line to retire the first result from among the plurality of first results; and broadcasting, by the arbiter, the second result, the third result, and the fourth result prior to retiring the second result, the third result, and the fourth result.

8. The method of claim 7, wherein the selecting is based on available retirement resources.

9. The method of claim 7, further comprising:

indicating, by the arbiter, whether the first result is speculative.

10. The method of claim 9, further comprising:

providing by the arbiter to a third storage, the first result as a speculative result in response to the first result being speculative.

11. The method of claim 10, further comprising:

selecting, by the arbiter, the first result for retirement in response to confirming a speculative instruction associated with the speculative result.

12. The method of claim 11, further comprising:

informing, by the arbiter, the third storage to delete the speculative result in response to confirming the speculative instruction.

13. A stunt box for selectively retiring a result from among a plurality of first results, the stunt box comprising:

a first storage configured to store a plurality of execution pipe results as the plurality of first results;

a second storage configured to store a plurality of second results;

a stunt box mux configured to selectively provide the plurality of second results from among the plurality of first results, the plurality of second results not including the result from among the plurality of first results;

a third storage configured to store the result as a speculative result in response to the result being speculative;

an arbiter configured to:

select the result from the plurality of first results to retire, provide a select line to the stunt box mux to configure the stunt box mux to not provide the result within the plurality of second results, and provide the result as the speculative result to the third storage in response to the result being speculative; and a second arbiter configured to:

receive the speculative result from the third storage, and provide the speculative result to the arbiter for retirement in response to confirming a speculative instruction associated with the speculative result, wherein the arbiter is further configured to inform the third storage to delete the speculative result in response to the second arbiter confirming the speculative instruction.

14. The stunt box of claim 13, wherein the arbiter is further configured to select the result based on a current set of available retirement resources.

15. The stunt box of claim 13, wherein arbiter is further configured to retire the result with an indication that the result is speculative in response to the result being speculative.

16. The stunt box of claim 15, wherein the third storage is configured to store the result as a speculative result in response to the indication.

* * * * *